United States Patent [19]

Samanta et al.

[11] 4,227,842
[45] Oct. 14, 1980

[54] METHOD OF USING $Si_3N_4.Y_2O_3.SiO_2$ CERAMIC SYSTEM FOR MACHINING CAST IRON

[75] Inventors: Shyam K. Samanta, Ypsilanti; Krishnamoorthy Subramanian, Inkster; Andre Ezis, Grosse Ile, all of Mich.

[73] Assignee: Ford Motor Company, Dearborn, Mich.

[21] Appl. No.: 105,829

[22] Filed: Dec. 20, 1979

Related U.S. Application Data

[60] Continuation-in-part of Ser. No. 954,796, Oct. 25, 1978, abandoned, which is a division of Ser. No. 911,256, May 31, 1978.

[51] Int. Cl.$^3$ .................. B23C 1/00; C04B 35/58; C04B 35/50
[52] U.S. Cl. .................. 409/131; 82/1C; 106/73.2; 106/73.5; 51/308; 51/309; 408/1R; 407/119
[58] Field of Search .................. 106/55, 73.2, 73.5; 51/308, 309, 291; 82/1 C; 408/1 R; 407/119; 409/131

[56] References Cited

U.S. PATENT DOCUMENTS

| | | | |
|---|---|---|---|
| 3,830,652 | 8/1974 | Gazza | 106/73.5 |
| 3,833,389 | 9/1974 | Koneya | 106/55 |

FOREIGN PATENT DOCUMENTS 49-113803  10/1974  Japan.

OTHER PUBLICATIONS

Smith J. T., "Temperature and Compositional Stability of a $Y_6Si_6O_{21}$ Phase in Oxidized $Si_3N_4$", J. Am. Ceramic Society Sep.–Oct. 1977 pp. 464–466.

Primary Examiner—O. R. Vertiz
Assistant Examiner—Mark Bell
Attorney, Agent, or Firm—Joseph W. Malleck; Keith L. Zerschling

[57] ABSTRACT

A process for continuous or interrupted machine cutting of solid cast iron by milling, turning or boring with a shaped tool, wherein said shaped tool is a ceramic consisting essentially of $Si_3N_4$ and 4–12% by weight $Y_2O_3$, produced by hot pressing at a pressure and a temperature of 1700°–1750° C. to achieve substantially full density.

5 Claims, 7 Drawing Figures

METHOD OF USING SI$_3$N$_4$.Y$_2$O$_3$.SIO$_2$ CERAMIC SYSTEM FOR MACHINING CAST IRON

RELATED APPLICATIONS

This application is a continuation-in-part of U.S. Ser. No. 954,796 filed Oct. 25, 1978, now abandoned, which in turn is a divisional application of U.S. Ser. No. 911,256 filed May 31, 1978.

BACKGROUND OF THE INVENTION

Recently, ceramics composed principally of silicon nitride (Si$_3$N$_4$) have found significant use as ceramic components for machines or as vessel coatings. This material is known to have many good characteristics at high temperatures (1200°–1400° C.), e.g., good oxidation resistance, good mechanical strength, and good hardness.

Strength of this material is related to density and it has been found that the densification property of silicon nitride, sintered under atmospheric pressure, is very inferior. Therefore, it has been considered important to employ high pressure when a product of good strength is desired. This is routinely referred to as hot pressing of silicon nitride. However, in spite of the use of hot pressing, the bend strength of simple Si$_3$N$_4$ has not been as high as desired at high temperatures. Accordingly, other avenues of strength improvement have been sought such as through the use of additives wich operate as a low temperature liquid phase to facilitate densification and not significantly imparing the creep resistance of the ceramic body at high temperatures. These added materials have included relatively large amounts of chromium oxide, zinc oxide, nickel oxide, titanium oxide, cerium oxide, magnesium oxide, yttrium oxide and others, ranging in excess of 20% (wt.) of the matrix material. Silicon nitride with these particular additives tends to form a structure having a strength level which does not usually exceed 50 KSI at high temperatures. In one instance (U.S. Pat. No. 3,830,652 to Gazza) the prior art did report strength levels in excess of 50 KSI. In this instance, the concern was for physical characteristics useful for turbine elements: hardness, oxidation resistance (inertness) and transverse rupture strength. Gaza explored metal oxide additives to a Si$_3$N$_4$ system which ranged in amounts related solely to machine element usage. The additions were added in amounts up to 20%.

However, commercial cutting tools used today and prepared from materials other than silicon nitride exhibit the same or better physical properties than the silicon nitride based materials which were the focus of Gaza's work. For example, commercial Al$_2$O$_3$ or TiC tools have excellent hardness at high temperatures. They also have high resistance to oxidation and have transverse rupture strengths at high temperatures which range up to 100,000 psi. Strength has heretofore been considered and the most important feature of tools because of the necessity to withstand forces imposed on the tool material by the tool fixture and by the resistance of the stock material, particularly at heavy depths of cutting. These forces become unusually exaggerated when cutting ferrous material such as cast iron at high speeds and feeds. Without increased strength, it is believed by those skilled in the art that further improvements in tool life cannot be achieved. Since the strength level of Si$_3$N$_4$ is equal to or lower than commercial materials now available, it has been rejected as a tool material candidate with little hope of improving tool life.

In only one known instance has the art attempted to employ Si$_3$N$_4$ directly as a cutting tool material and this was for use only on hypereutectic aluminum alloys. This attempt is set forth in Japanese patent 49-113803 (10-30-1974) by Kazutaka Ohgo, appearing in Chemical Abstracts, Volume 84, 1976, page 286 (84:21440t). In this work, silicon nitride was sintered (as opposed to hot pressing) and metal oxide spinels were employed in solid solution in the silicon nitride matrix. The spinels were formed by a mixture of divalent and trivalent metal oxides (including magnesium oxide and Y$_2$O$_3$): However, the molar percentage of the spinel metal oxide in the material was taught to be 10–40%. The author experienced difficulty in obtaining good sintering density when the molar percentage fell below 10. The highest density achieved was 3.18 g/cm$^3$.

A two step method was used by Ohgo requiring first a heating of the metal oxide powders to 1300°–1600° C. for 3–10 hours to form the spinel. The spinel was pulverized and mixed with a silicon nitride powder, which in turn was sintered to form cutting tools. Only a quarternary system was employed involving Si$_3$N$_4$, SiO$_2$, MgO and Y$_2$O$_3$. This produced may secondary phases which weakened the physical characteristics, particularly strength, thermal conductivity, and increased the thermal coefficient of expansion. A loss of these physical characteristics make it most difficult to obtain even equivalent performance of commercially available tools when applied to a rigorous cutting environment such as interrupted cutting on cast iron.

The cutting operation used by Ohgo was of very short duration (2 minutes) of continuous machining and at low metal removal rates (cutting speeds of 1000 sfm, 0.012 inches per rev. of feed and 0.060 inches of depth of cut and metal removal of 8.64 in.$^3$/min.). This type of test information, of course, did not investigate cutting applications where large forces are applied to the tool, did not investigate the elimination of speed additives, did not investigate heavy cutting against rough surfaces such as cast iron, nor continuous cutting for periods of several hours or greater, nor did it explore intermittent, interrupted high speed cutting at speeds of 4000–5000 sfm at heavy feeds and depths of cutting. The demonstrated wear of 0.006–0.008 inches, in Ohgo's work, for 2 minutes of cutting time is highly excessive when compared to the goals of the present invention. Therefore, this work did not demonstrate that Si$_3$N$_4$ possessed sufficient characteristics to be used as a tool material on ferrous materials which apply large bend forces to the tool.

Moreover, the art has been possessed of sufficient knowledge in the making of Si$_3$N$_4$ with additives for many years; during this long term no effort was made to apply this material as a cutting tool against cast iron. This tends to support the contention of this invention that if tool life is dramatically increased for certain Si$_3$N$_4$ composites when used for machining cast iron, there must be some unobvious characteristics independent of strength that layed undiscovered to promote this new use.

This invention has discovered a correlation between a thermal shock parameter and promotion of prolonged life in Si$_3$N$_4$ materials when used as a cutting tool on cast iron. This parameter consists of KS/$\alpha$E where K is thermal conductivity of the material, S is the modulus of rupture, α the coefficient of thermal expansion, and E is Young's modulus. E can be eliminated from the parameter since it remains substantially constant for the contemplated variation in ceramic chemistry which controls this parameter. This parameter must exceed $26 \times 10^9$ btu-lbs/hr (in.$^3$) as minimal if significant improvement in tool life is to be obtained. It has been further discovered that a simple ternary ceramic system ($Si_3N_4.SiO_2$. low temp. liquid phase) with $SiO_2$ present, not as an additive, but as an inherent reaction product of heating $Si_3N_4$, serves as the proper mechanism for achieving the required thermal shock parameter. The low temperature liquid phase must be one which produces a small amount of highly refractory oxynitrides and/or silicates which will reside totally in the grain boundary of the matrix. There are many other physical characteristics beyond its thermal shock parameter that should be improved in silicon nitride if it is to be successful as a tool material for cutting cast iron. As indicated earlier, the densification of the material has been a point of concern and has been alleviated by use of hot pressing techniques and oxide additives. This has permitted the density to be elevated close to theoretical density, but improving density by itself through increasing amounts of oxide leads to a decrease in several other physical properties. The attainable hardness level and general rigidity of the known silicon nitride composites have yet to be comparable to commercial cutting tools. Investigators have failed to perceive this interplay of physical characteristics. Known silicon nitride compositions, when used as a cutting tool against relatively rough surfaces such as cast iron, exhibit a failure mode under such circumstances that is typically due to thermal shock as opposed to the more desirable mode by wear.

SUMMARY OF THE INVENTION

The invention relates to a process for continuous or interrupted machine cutting of solid cast iron stock by milling, turning or boring with a shaped tool. The tool consists essentially of $Si_3N_4$ and 4–12% by weight $Y_2O_3$. The tool material is densified from a powder mixture by hot pressing at a predetermined pressure, the pressure being maintained continuously during heating at an ultimate pressing temperature (advantageously 1700°–1750° C.) until substantially full density is obtained. In carrying out the machine cutting, the shaped tool advantageously consists essentially of a ceramic of $Si_3N_4.SiO_2.Y_2O_3$, with milling media impurities, the $SiO_2$ being present as an oxide surface coating on the grains of the $Si_3N_4$. Machine cutting with this tool can be carried out at a mass removal rate exceeding 8.6 in$^3$/min. for 20 minutes with tool wear not exceeding 0.01 inches and no evidence of thermal cracking. The cutting conditions preferably exceed 1000 sfm, 0.1 in depth of cut, 0.02 inch feed.

It is advantageous to carry out the hot pressing at a pressure of 3.8–6.5 ksi for 1–8 hours to effect a stable, highly refractory secondary phase in the grain boundary of the $Si_3N_4$ matrix.

A primary object of this invention is to provide an unobvious new use of $Si_3N_4$ for successfully cutting rough ferrous materials, particularly cast iron, under severe cutting conditions. Pursuant to this object, the following features have been found advantageous: (a) formulation of a ceramic system ($Si_3N_4.SiO_2.Y_2O_3$) which exhibits a thermal shock parameter at 1200° C. which is at least $26 \times 10^9$ (BTU-lbs/Hr (in.)$^3$), and a thermal shock parameter at room temperature which is at least $220 \times 10^9$ (BTU-lbs/Hr (in.)$^3$); (b) regulating the ceramic system to avoid the presence of a spinel oxide and to insure formation of a low temperature liquid phase effective to form a highly refractory oxynitride and/or silicate residing only in the grain boundaries of the $Si_3N_4$ matrix; and (c) regulating the processing of the ceramic system to provide a combination of specific physical characteristics in the material, including physical strength (as measured in a 4-point bend test) which is at least 70,000 psi at 700° C., a hardness level which is at least 86 using the Rockwell 45-N standard, a density of at least 3.25 g/cm$^3$, a coefficient of thermal expansion which is no greater than $1.88 \times 10^{-6}$ in/in °F. at 1200° C., a thermal conductivity level of at least 0.727 BTU/Hr in °F. at 1200° C., and a modulus of elasticity no greater than $55.3 \times 10^6$ psi.

DESCRIPTION OF THE DRAWINGS

FIGS. 4 and 5 are before machining and after machining photographs of the actual casting of FIG. 3; FIG. 4 depicts the front face side and FIG. 5 depicts the rear spindle side;

DETAILED DESCRIPTION

The tendency toward higher speeds and feeds to achieve lower production costs and higher productivity imposes an ever increasing demand for greater wear life on cutting tools. The temperature rise at the tool tips at those speeds and feeds is very high. Tool materials have to be inert at such working temperatures and their dynamic properties have to be superior to those of existing tool materials.

In accordance with this invention, it has been discovered that $Si_3N_4$, when combined with controlled amounts of certain metal oxides in a narrow volume fraction range, then hot pressed under controlled temperature, pressure and time conditions, will produce a cutting tool composition for a simple ternary system ($Si_3N_4.SiO_2.Y_2O_3$). This composition can be used at high speeds and heavy feed on cast iron and will exhibit high wear resistance and will fail by a mode of gradual wear, rather than thermal fatigue or catashopic failure.

The cutting tool formulation meets the needs of a specific set of cutting conditions created by working on cast iron. The tip temperature of the tool will experience a temperature typically in the range of 600°–800° C. This temperature factor is important since it is high enough to create thermal shock sites in portions of the tool, but not high enough to create a serious oxidation erosion problem. When machining cast iron, the chip easily fragments keeping any hot chip normally away from the tool tip.

Due to the resistance of cast iron to cutting, large fixture forces must be applied to the tool to move it through the stock material. Moreover, the mass removal rates required in many cutting operations on cast iron is considerably greater than used with other stock materials. This necessitates a strong tool material with respect to transverse rupture strength. All tool designers consider this latter aspect the most important consideration with respect to evaluating the success of a new tool material.

The three virtues normally recognized of $Si_3N_4$ would not suggest to one skilled in the art that it would be a successful candidate for machining cast iron. Its transverse rupture strength at high temperature rarely exceeded 50,000 psi (while commercial tools regularly experienced strength levels of 100,000-200,000 psi); its high oxidation resistance was not critically needed; and its good hardness at high temperature was easily exceeded by the hardness of commercially available silicon carbide tools.

The present invention recognized for the first time the role played by thermal shock resistance factors, namely, the coefficient of thermal expansion ($\alpha$) and thermal conductivity (K) related to the modulus of rupture (S). This is defined herein by the expression $KS/\alpha E$ where E is Young's modulus and can be eliminated because it remains substantially constant under verying cutting conditions and material variations. By maintaining this thermal shock parameter above $26 \times 10^9$ BTU-lbs/Hr (in$^3$), it has been determined that a significant increase in wear life can be achieved on cast iron. It is difficult to theorize why this phenomenon takes place, but it may be due to the greater structural stability that is achieved by the ceramic at 700° C. when generated heat is quickly conducted away preventing a large temperature gradient in the tool which leads to cracking if the material has an undesirable coefficient of thermal expansion; this may more readily be experienced when the tool tip is slightly cooled by intermittent or interrupted cutting.

A preferred method for making such a cutting tool is as follows:

(1) A first powder of substantially alpha phase silicon nitride is prepared having less than 1.0% cation impurities (excluding free silicon), about 1% free silicon, and about 0.7% by weight oxygen.

(2) A second powder of $Y_2O_3$ is selected. $Y_2O_3$ is characterized by a small atom size and the affinity to form a low temperature liquid phase which solidifies as a highly refractory secondary phase residing solely within the grain boundaries of the matrix. It is important to avoid the formation of spinels which will produce weaker secondary phases.

(3) The first and second powders are blended and mixed in a prescribed proportion, preferably by a milling machine which may employ milling media constituted of $Al_2O_3$, WC, W, or TiC. The second powder should have a weight percent of 4-12% of mixture, except for impurities due to the milling media.

(4) The powder mixture is heated to a temperature level of 1700°-1750° C. for a period of 3-8 hours under a pressure of 3,800-6,500 psi, and allowed to cool at an average rate of 100°/hr. The hot pressed compact will exhibit substantially complete Beta phase silicon nitride.

The resulting product exhibits the following combination of physical characteristics:

(a) 100% theoretical density (zero porosity);
(b) a thermal shock parameter of at least $26 \times 10^9$ (BTU-lbs/Hr (in$^3$));
(c) a transverse rupture strength at 1200° C. (in 4-point bending) of at least 67,000 psi;
(d) a hardness level of at least 86 Rockwell 45-N;
(e) a measured density of at least 3.25 g/cm$^3$;
(f) a wear life characterized by measured wear of no greater than 0.010" after one hour of continuous cutting of cast iron at a mass removal of at least 25 in$^3$/min or mechanical failure under cutting conditions prescribed by at least 2000 feet per minute with a depth of cut of at least 0.06 inches and a rate of feed of at least 0.012 inches per IPR;
(g) the absence of tool failure by fracture or chipping.

EXAMPLE 1

A sample cutting tool material (identified as Sample 1) was prepared employing hot pressed silicon nitride with 7.47 wt. percent $Y_2O_3$ (8% $Y_2O_3$ was added as a powder to a powder having 85% alpha phase $Si_3N_4$); the powder mixture was hot pressed at a temperature of 1740° C. under 6500 psi ($9.55 \times 10^6$ kilogram/cm$^2$) for a period of 6½ hours. Although all samples in this example were pressed at 6500 psi, similar successful machining properties can be achieved with pressures as low as 3800 psi. The pieces of hot pressed material were ground to a tool geometry of SNG 434 and the edges were prepared with 0.006"×30° K. land (chamfer). Each of the cutting tools prepared from this material were subjected to a cutting sequence on a simple cylindrical cast iron casting which varied between continuous, intermittent, or interrupted.

Figure 1:
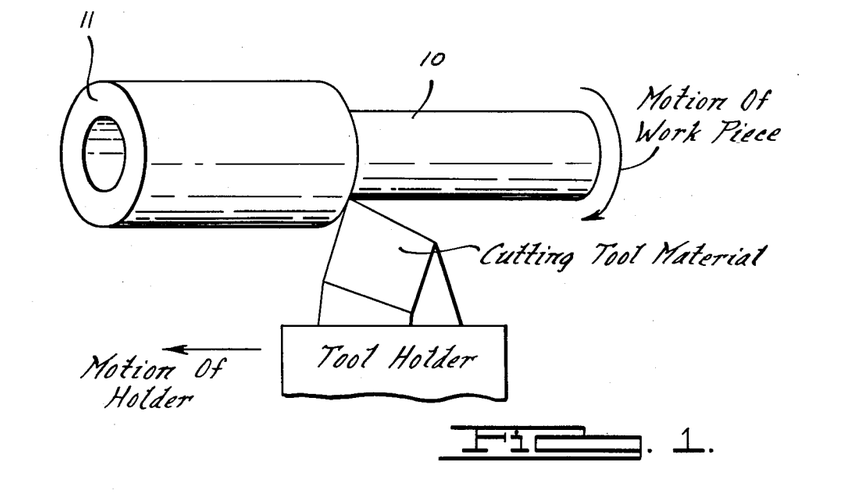
FIG. 1 is a perspective view of the work stock employed in a first set of laboratory cutting operations requiring continuous cutting simulation.
Figures 2, 3:
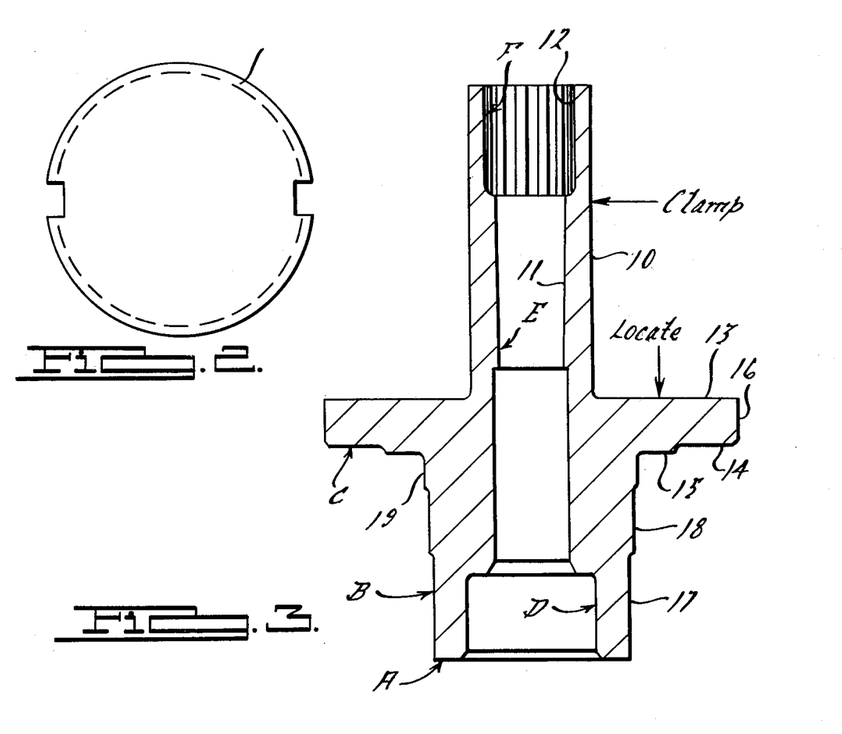
FIG. 2 is an end view of a work stock similar to FIG. 1 illustrating the mode to simulate interrupted cutting.
FIG. 3 is central sectional view of a stator support casting used as the stock material for production machining examples.

As shown in FIG. 1, the continuous cutting consisted of generating cylindrical surface 10 at a prescribed speed, feed and depth of cut. Due to the expanded length of the cylinder 11, the tool tip experiences a relatively constant high temperature for the duration of the pass. Intermittent cutting consisted of withdrawing the tool intermittently along a longitudinal pass. Interrupted cutting consisted of passing the tool circumferentially about the cylinder along a path 12 (as shown in FIG. 2) which path encounters the previously cut longitudinal grooves. The latter provides repeated impact for the tool.

Each type of cutting style imposes a different thermal condition on the tool which affects tool life in different ways. Other tool material samples were similarly prepared with different chemistries, as shown in Table I, along with their resultant physical properties.

The cutting operation for all these samples was carried out in a laboratory environment at a variety of speeds and varying feed rates at a constant depth of cut; the tool geometry was varied only in the corner configuration as indicated. The wear in inches was measured for specific period of time. The results of such cutting are shown in Table II. None of the tools were used to full life; the cutting time was terminated when a significant increase in tool life was perceived. Five minutes, under high cutting speeds (3,000-4,000 sfm) was deemed an unusually high increase in life when compared to commercial tools which typically fail after one minute.

It is believed that optimization of the thermal shock parameter of $Si_3N_4$ under extreme temperature conditions has led to this increase in tool life. The ability to have a stable structure at 600°-800° C. temperature while under severe stress along with the ability to effectively conduct away heat preventing a loss in high temperature strength provides the basis for this life improvement. These physical characteristics are critically affected by the compositional phase of the $Si_3N_4$ composite. It is most important that the selected additives form a highly stable refractory oxynitride and/or silicate which resides totally in the grain boundary of the matrix.

EXAMPLE II

Figure 4:
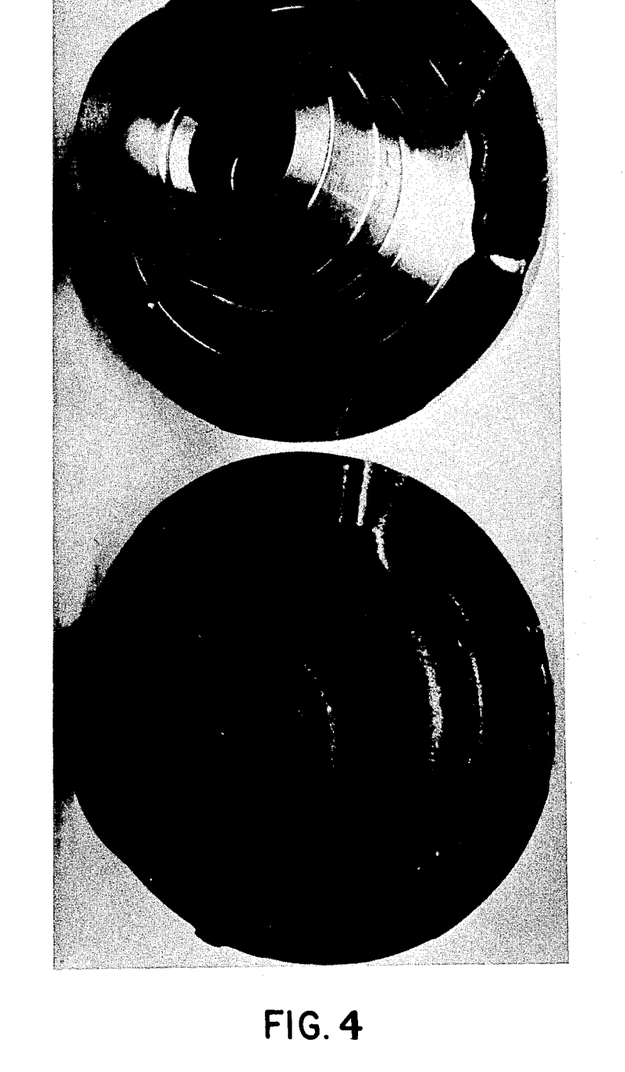
Figure 5:
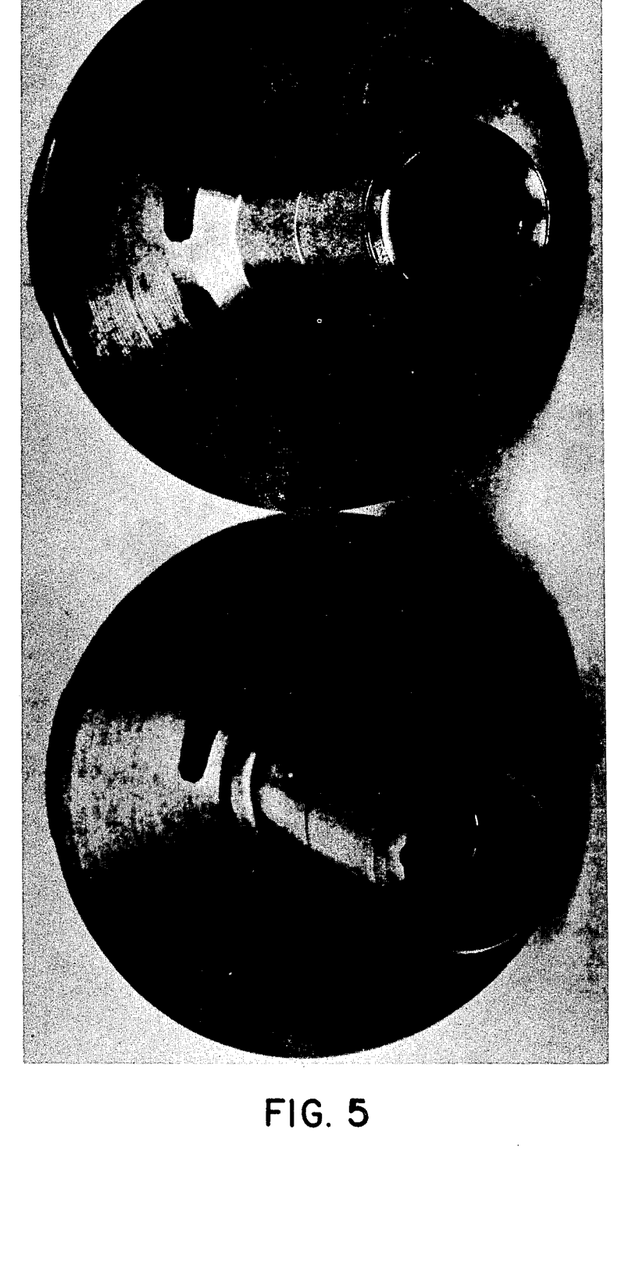

Substantially the same cutting tool materials, prepared as indicated from Example I, were prepared for cutting use in a production environment with actual production machines at Ford Motor Company's machining plants. The casting to be machined was a difficult production vehicle casting (stator support) in some cases and an engine block in others; the stator support is shown in FIGS. 3, 4 and 5. For the stator support, continuous cutting was experienced at surfaces B and D, intermittent cutting at surface A, and interrupted cutting at surfaces C and F (see FIG. 4).

These sample materials were run under a variety of cutting conditions as set forth in Table III. All tool materials were run to failure which is measured by the number of pieces produced up to that failure event. Failure herein is defined (as regularly as accepted in the industry) to mean loss of workpiece tolerance or failure by fracture or chipping.

From the data in Tables II and III, we have discovered that controlled processing of $Si_3N_4$ with $Y_2O_3$ provides the kind of thermal shock parameter that leads to longer tool life when machining cast iron at large mass removal rates or high speed. These metal oxides operate upon the controlled free silica to form a highly stable refractory silicate which resides totally in the grain boundary of the $Si_3N_4$ matrix.

Table III proceeds from lower cutting speeds to higher speeds with comparative materials grouped adjacent each other. For each comparison the inventive samples render significant increases in tool life.

The inventive materials perform 3-8 times better than the current commercial tools. In finish machining of the front end of an engine block, the number of blocks milled were 2100 pieces per corner with a depth of cut of 0.065 inch. Whereas using commercially available ceramics with half of that feed rate, the number is 600 pieces. The inventive material will provide (a) increased production at current cutting conditions, (b) increased production capacity at higher cutting speeds and feeds, (c) savings in tool material cost, (d) reduction in tool change downtime, and (e) increased production capacity leading to free machine time for preventive maintenance.

Figure 6:
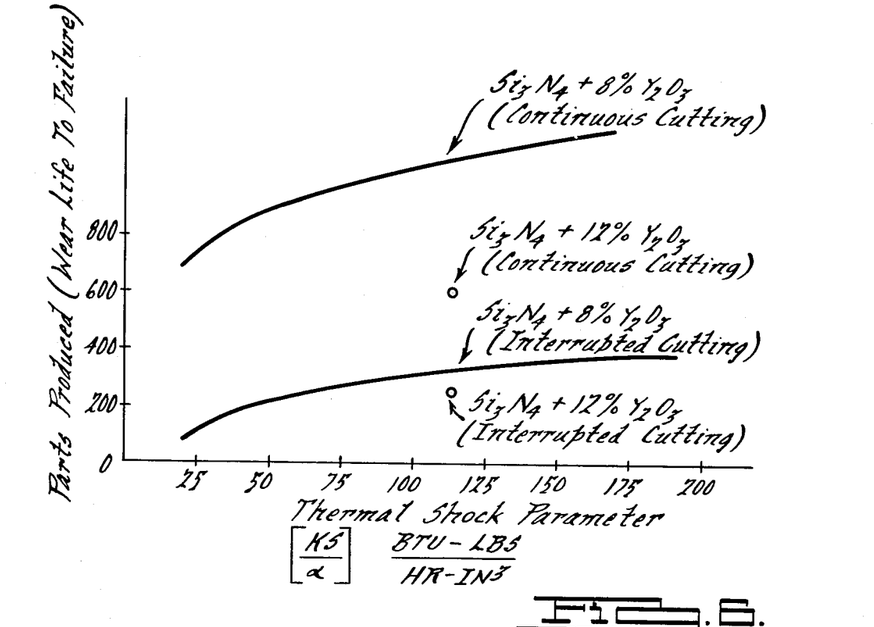
FIG. 6 is a graphical illustration of wear life to failure vs. thermal shock parameter employing the invention.

To obtain at least a four-fold increase in tool life over commercially available tool materials the $Si_3N_4 \cdot SiO_2 \cdot Y_2O_3$ ternary system must be employed with $Y_2O_3$ controlled to a limit of 7-9%. In this manner the thermal shock parameters can be optimized at either continuous or interrupted cutting conditions. FIG. 6 and Table IV portrays the role played by the thermal shock parameter.

Figure 7:
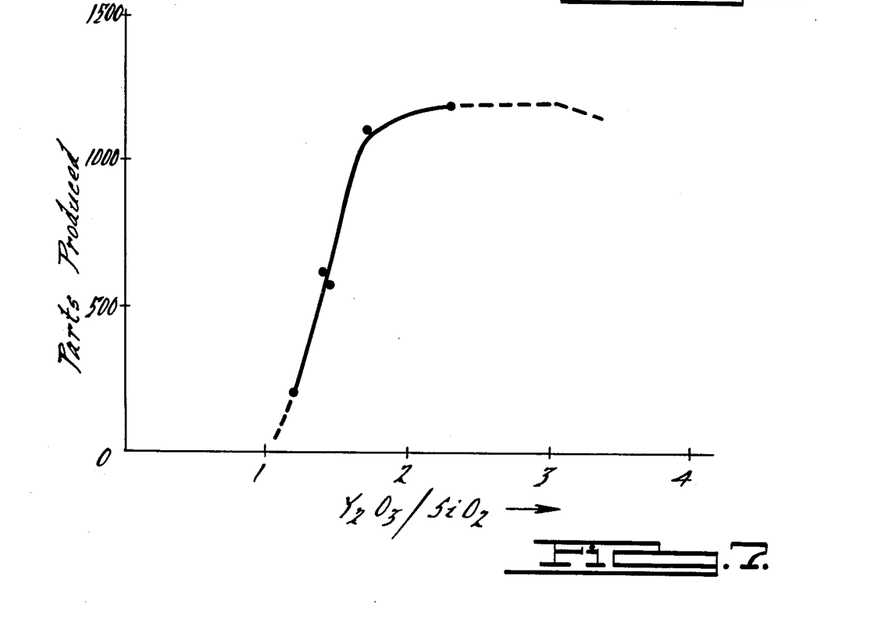
FIG. 7 is a graphical illustration of wear life to failure vs. $Y_2O_3/SiO_2$ ratio.

Additionally, $Y_2O_3/SiO_2$ ratio must exceed 1.60. The influence of the $Y_2O_3/SiO_2$ ratio is portrayed in FIG. 7 and Table V.

TABLE I

| Material Sample | S, Transverse Rupture Strength (4-Point Bending), KSI | | Hardness Room Temp. Rockwell 45-N | Density gm/cm³ | $\alpha$, Coefficient of Thermal Expansion $\times 10^{-6}$ in/in°F. | | K, Thermal Conductivity, BTU/Hr in °F. | | $\frac{KS}{\alpha}$, Thermal Shock Factor BTU-lbs. Hr (in³) | | E (Young') Modulus $10^6$ psi |
|---|---|---|---|---|---|---|---|---|---|---|---|
| | Room Temp. | 1200° C. | | | Room Temp. | 1200° C. | Room Temp. | 1200° C. | Room Temp. | 1200° C. | |
| Sample No. 1 $Si_3N_4 + 8\% Y_2O_3$ | 103.6 | 105.7 | 87.6 | 3.4 | 0.87 | 1.87 | 3.23 | 3.23 | 179 | 182 | 53 |
| Sample No. 2 $Si_3N_4 + 11-12\% Y_2O_3$ | 115 | 70 | 87.0 | 3.398 | 1.5 | 2.7 | 4.4 | 4.4 | 337 | 114 | 51 |
| Sample No. 3 $Si_3N_4 + 5\% MgO$ | 85 | 67 | 86.3 | 3.272 | 84 | 1.84 | 1.917 | .727 | 194 | 26 | 55.3 |
| Sample No. 4 $Si_3N_4 + 1\% MgO$ | 129 | 87.4 | 89.2 | 3.25 | .74 | 1.74 | 1.917 | .727 | 334 | 36 | 54.7 |
| Sample No. 5 $Si_3N_4 + 15\%$ (88% ZrO + 12% $Y_2O_3$ known as Zytrite) | Substantially equivalent properties to Sample 2. | | | | | | | | | | |
| Sample No. 6 $Si_3N_4 + 15$ (88% ZrO + 12% $Y_2O_3$ + 1.5 Fe impurities known as modified Zytrite) | Substantially equivalent properties to Sample 2. | | | | | | | | | | |
| Sample No. 7 SiC (Prior Art) | | 93 | 91.5 | 3.29 | 1.53 | 2.57 | 4.09 | 1.71 | | | |
| Sample No. 8 $Al_2O_3$ (Prior Art) | 75 | 30 | 90.14 | 4.252 | 4.4 | 5.7 | 1.9 | 3 | 324 | 16 | 67 |

TABLE II

| | Cutting Condition | | | | | | | | |
|---|---|---|---|---|---|---|---|---|---|
| Sample No. | Corner Configuration Number | Speed (sfm) | Feed (ipr) | Depth of cut (in.) | Mass of Material Removed in³/min | Time (MIN) or (min-sec) | Tool Wear (Inches) | | Thermal and Mechanical Cracks |
| | | | | | | | Flank | Crater | |
| Continous Cutting | | | | | | | | | |
| 1A | 1 | 4000 | .010 | .100 | 48 | 5.2 | none | none | NIL |

TABLE II-continued

| Sample No. | Corner Configuration Number | Cutting Condition Speed (sfm) | Feed (ipr) | Depth of cut (in.) | Mass of Material Removed in³/min | Time (MIN) or (min-sec) | Tool Wear (Inches) Flank | Crater | Thermal and Mechanical Cracks |
|---|---|---|---|---|---|---|---|---|---|
| 1B | 3 | 3000 | .020 | .100 | 72 | 5.7 | none | none | NIL |
| 1C | 1 | 3000 | .010 | .100 | 36 | 17.5 | none | none | NIL |
| 1D | 1 | 2000 | .0111 | .100 | 26.4 | 43.7 | none | none | NIL |
| 1E | 3 | 1000 | .0222 | .100 | 26.4 | 26.8 | none | none | NIL |
| 1F | 2 | 750 | .029 | .100 | 26.4 | 11.7 | none | none | NIL |
| 1G | 1 | 500 | .044 | .100 | 26.4 | 10.5 | none | none | NIL |
| 1H | 2 | 333 | .066 | .100 | 26.4 | 1.9 | none | none | Mechanical Fracture |
| 1I | 3 | 2000 | .011 | .100 | — | 21.0 | .015" | none | NIL |
| Intermittant Cutting | | | | | | | | | |
| 1K | 2 | 1000 | .011 | .100 | 13.2 | 2.3 | none | none | NIL |
| 1L | 5 | 750 | .029 | .100 | 26.4 | 1.1 | none | none | NIL |
| 1M | 6 | 750 | .044 | .100 | 39.6 | 0.6 | none | none | NIL |
| 1N | 7 | 500 | .011 | .100 | 6.6 | 4.1 | none | none | NIL |
| 1O | 4 | 2000 | .011 | .100 | 26.4 | 8.8 | none | none | NIL |
| 1P | 8 | 1000 | .022 | .100 | 26.4 | 7.7 | none | none | NIL |
| Interrupted Cutting | | | | | | | | | |
| 1Q | 6 | 1000 | .0111 | .100 | 13.2 | 3.7 | .0016" | NIL | NIL |
| 1R | 8 | 1000 | .0222 | .100 | 26.4 | 10.0 | .0013 | NIL | NIL |
| 1S | 7 | 2000 | .0111 | .100 | 26.4 | 10.5 | .0021 | NIL | NIL |
| Continuous Cutting | | | | | | | | | |
| 3A | 1(Trial 1) | 2000 | .0111 | .100 | 26.4 | 2.05 | .0055 | — | NIL |
| 3B | 3(Trial 2) | 2000 | .0111 | .100 | 26.4 | 9.95 | .0015" | — | NIL |
| 3C | 4 | 1000 | .0222 | .100 | 26.4 | 9.92 | .0018 | — | NIL |
| Interrupted Cutting | | | | | | | | | |
| 3D | 4 | 1000 | .0222 | .100 | 26.4 | 10.00 | | — | NIL |
| Continuous Cutting | | | | | | | | | |
| 4A | 1 | 2000 | .0111 | .100 | 26.4 | 9.65 | .002 | — | NIL |
| 4B | 2 | 1000 | .0222 | .100 | 26.4 | 10.5 | .001 | — | NIL |
| 5A | 2(Trial 1) | 2000 | .0111 | .100 | 26.4 | 9.82 | .0116 | — | NIL |
| 5B | 3(Trial 2) | 2000 | .0111 | .100 | 26.4 | 10.00 | .002 | — | NIL |
| 5C | 1 | 1000 | .0222 | .100 | 26.4 | 9.88 | .0019 | — | NIL |
| 6A | (Trial 1) | 2000 | .011 | .100 | 26.4 | 10.00 | .005 | — | NIL |
| 6B | (Trial 2) | 2000 | .011 | .100 | 26.4 | 5.15 | .002 | — | NIL |
| 6C | | 1000 | .022 | .100 | 26.4 | 10.10 | .002 | — | NIL |
| Continuous Cutting | | | | | | | | | |
| 7A | | 2000 | .0111 | .10 | 26.4 | 0.02" | Faction by Fracture | | Mechanical Fracture |
| 7B | | 1000 | .0222 | .10 | 26.4 | 0'15" | Faction by Fracture | | Mechanical Fracture |
| 7C | | 1000 | .0111 | .100 | 13.2 | 0'11" | Faction by Fracture | | Mechanical Fracture |

TABLE III

| Sample | Material | Cutting Operation | Tool Geometry | Cutting Conditions Speed (sfm) | Feed (ipr) | Depth of Cut (inches) | Work Pieces Produced before Failure |
|---|---|---|---|---|---|---|---|
| 1 | Hot Pressed Si₃N₄ + 8% Y₂O₃ | Broaching of Engine block Surface | SNG 636 | 150 | — | .02 | 1910 |
| 10 | (Prior Art Tool) WC | Broaching of Engine block Surface | " | 150 | — | .02 | 800 |
| 1 | Hot Pressed Si₃N₄ + 8% Y₂O₃ | Rough facing of Surface A (intermittent cutting) | SNG 434 | 496 | .016 | .125–.250 | 1200 |
| | Hot Pressed Si₃N₄ + 1% MgO | Rough facing of Surface A (intermittent cutting) | " | " | " | .125–.250 | 800 |
| | Hot Pressed Si N +0 5% MgO | Rough facing of Surface A (intermittent cutting) | " | " | " | .125–.250 | 740 |
| | (Prior Art Tool) SiC base tool coated with Al₂O₃ | Rough facing of Surface A (intermittent cutting) | " | " | " | .125–.250 | 150 |
| 1 | Hot Pressed | Semi finish and | TPG 322 | 516 | .012– | .025 | 1000 |

TABLE III-continued

| Sample | Material | Cutting Operation | Tool Geometry | Speed (sfm) | Feed (ipr) | Depth of Cut (inches) | Work Pieces Produced before Failure |
|---|---|---|---|---|---|---|---|
| | Si$_3$N$_4$ + 8 Y$_2$O$_3$ | finish bore surface E (continuous cutting) | | | .006 | | |
| | (Prior Art Tool) WC | Semi finish and finish bore surface E (continuous cutting) | " | " | .012–.006 | " | 250 |
| 1 | Hot Pressed Si$_3$N$_4$ + Y$_2$O$_3$ | Semi-finish and finish bore surface F (spline hole) (Interrupted cutting | TPG 322 | 516 | .0135 –.006 | .025 | 320 |
| 1 | Hot Pressed Si$_3$N$_4$ + 8 Y$_2$O$_3$ | Rough face of Surface C (interrupted cutting) | TNG 434 | 965–496 | .012 | .093 | 420 |
| | Hot Pressed Si$_3$N$_4$ + 1% MgO | Rough face of Surface C (interrupted cutting) | " | 965–496 | " | " | 140 |
| | (Prior Art Tool) SiC base tool coated with Al$_2$O$_3$ | Rough face of Surface C (interrupted cutting) | " | 965–496 | " | " | 50 |
| | Hot Pressed Si$_3$N$_4$ + 8 Y$_2$O$_3$ | Rough turning of outside diameter on surface B (continuous cutting) | TNG 434 | 998 | .014 | .0625 | 420 |
| | (Prior Art Tool) SiC base tool coated with Al$_2$O$_3$ | Rough turning of outside diameter on surface B (continuous cutting) | TNG 434 | 998 | .014 | .0625 | 50 |
| 1 | Hot Pressed Si$_3$N$_4$ + 8 Y$_2$O$_3$ | Rough boring of inside diameter on surface D (continuous cutting) | TNG 434 | 1026 674 | .0189 to .0039 | .0625 | 157 |
| | (Prior Art Tool) SiC base tool coated with Al$_2$O$_3$ | Rough boring of inside diameter on surface D (continuous cutting | " | 1026 674 | .0189 to .0039 | " | 50 |
| 1 | Hot Pressed Si$_3$N$_4$ + 8 Y$_2$O$_3$ | Finish mill end of block (intermittent cutting) | | | .0043 (ipt) | .065 | 2100 |
| | Al$_2$O$_3$ base + 5% TiN | Finish mill end of block (intermittent cutting) | " | 1026 674 | .0043 (ipt) | " | 400 |

TABLE IV

| Sample No. | Thermal Shock Parameter $\frac{KS}{\alpha}$ | | Parts Produced | |
|---|---|---|---|---|
| | Room Temp. | High Temp. (1200° C.) | (Continuous Cutting) End Facing (A) | (Interrupted Cutting) Flange Machine (B) |
| Si$_3$N$_4$ + 8% Y$_2$O$_3$ | 179 | 182 | 1200 | 420 |
| Si$_3$N$_4$ + 1% MgO | 334 | 36 | 800 | 140 |
| Si$_3$N$_4$ + 5% MgO | 220 | 26 | 740 | — |
| Si$_3$N$_4$ + 12% Y$_2$O$_3$ | 114 | | 600 | 210 |
| Al$_2$O$_3$ | | 16 | 200 | Fails by thermal cracking at outset |

K = Thermal Conductivity, BTU/Hr in °F.
S = Modulus of Rupture, KSI, (4-point bending).
α = Coefficient of Thermal Expansion, X10$^{-6}$ in/in °F.

TABLE V

| Material | Cutting Condition | | | No. of Work Pieces Produced |
|---|---|---|---|---|
| | Speed (sfm) | Feed (ipr) | Depth of Cut (in) | |
| Hot Pressed Si$_3$N$_4$ with 8% | 496 | .016 | .125 to .250" | 1200 |

TABLE V-continued

| Material | Cutting Condition | | | No. of Work Pieces Produced |
|---|---|---|---|---|
| | Speed (sfm) | Feed (ipr) | Depth of Cut (in) | |
| $Y_2O_3$; $\frac{Y_2O_3}{SiO_2}$ 2.30 | | | | |
| Same; $\frac{Y_2O_3}{SiO_2} = 1.7$ | " | " | " | 1112 |
| Same $\frac{Y_2O_3}{SiO_2} = 1.41$ | " | " | " | 620 |
| Same; $\frac{Y_2O_3}{SiO_2} = 1.18$ | " | " | " | 200 |
| Hot Pressed $Si_3N_4$ with 11% $Y_2O_3$; $\frac{Y_2O_3}{SiO_2} = 1.45$ | " | " | " | 580 |

We claim:

1. A process for continuous or interrupted machine cutting of solid cast iron stock by milling, turning or boring with a shaped tool wherein said shaped tool is a ceramic consisting essentially of $Si_3N_4$ and 4-12% by weight $Y_2O_3$, produced by hot pressing at a predetermined pressure, said pressure being maintained continuously during heating at an ultimate pressing temperature of 1700°-1750° C. until a density of at least 3.25 g/cm³ is obtained and shaping the hot pressed ceramic into a cutting tool.

2. The process of claim 1, wherein the hot pressing is carried out for 1-8 hours at said temperature and at a pressure of 3.8-6.5 ksi to effect a stable highly refractory secondary phase in the grain boundary of the $Si_3N_4$ matrix, said phase serving as a binder and being inert to maintain the oxidation resistance of said material at a high level.

3. A process for continuous or interrupted machine cutting of solid cast iron stock by milling, turning or boring with a shaped tool wherein said shaped tool consists essentially of a ceramic of $Si_3N_4.SiO_2.Y_2O_3$ with milling media impurities, said $SiO_2$ being present as an oxide surface coating on the grains of said $Si_3N_4$ and said $Y_2O_3$ being present in an amount of 4-12%, said ceramic having been produced by hot pressing at a predetermined pressure, temperature and time period to effect a density of at least 3.25 g/cm³.

4. The process as in claim 3, in which said machine cutting is carried out for 20 minutes at a mass removal rate exceeding 8.6 in³/min. with resulting tool wear not exceeding 0.01 inches and no evidence of thermal cracking.

5. The process as in claim 3, in which said machine cutting is carried out at conditions which exceed 1000 sfm, 0.1 in depth of cut, 0.02 inch feed, and iron mass removal of 8.64 in³/min.

* * * * *